US010378618B2

(12) United States Patent
Dewey

(10) Patent No.: US 10,378,618 B2
(45) Date of Patent: Aug. 13, 2019

(54) MECHANICAL GEARBOX FOR USE WITH A VEHICLE AND METHODS OF ASSEMBLING THE SAME

(71) Applicant: Hub City, Inc., Aberdeen, SD (US)

(72) Inventor: Justin Lee Dewey, Aberdeen, SD (US)

(73) Assignee: Hub City, Inc., Aberdeen, SD (US)

(*) Notice: Subject to any disclaimer, the term of this patent is extended or adjusted under 35 U.S.C. 154(b) by 215 days.

(21) Appl. No.: 15/474,595

(22) Filed: Mar. 30, 2017

(65) Prior Publication Data

US 2018/0283498 A1 Oct. 4, 2018

(51) Int. Cl.

| | |
|---|---|
| ***B60K 25/06*** | (2006.01) |
| ***F16H 7/02*** | (2006.01) |
| ***F16H 57/023*** | (2012.01) |
| ***F16H 57/021*** | (2012.01) |
| ***B60K 17/04*** | (2006.01) |
| ***B60K 17/28*** | (2006.01) |
| ***B60K 25/02*** | (2006.01) |
| ***F02B 67/06*** | (2006.01) |
| ***F16H 57/038*** | (2012.01) |
| ***F16H 37/04*** | (2006.01) |

(52) U.S. Cl.

CPC ............. *F16H 7/02* (2013.01); *B60K 17/043* (2013.01); *B60K 17/28* (2013.01); *B60K 25/02* (2013.01); *F02B 67/06* (2013.01); *F16H 37/041* (2013.01); *F16H 57/021* (2013.01); *F16H 57/023* (2013.01); *F16H 57/038* (2013.01); *B60K 2025/022* (2013.01)

(58) Field of Classification Search

CPC ...... F16H 1/203; F16H 57/023; F16H 57/021; F16H 57/038; F16H 7/02; B60K 17/043; B60K 17/28; B60K 25/02; B60K 2025/022; F02B 67/06; F01P 5/04

USPC ................... 180/53.6; 74/409, 416, 417, 423

See application file for complete search history.

(56) References Cited

U.S. PATENT DOCUMENTS

| | | | | |
|---|---|---|---|---|
| 5,505,101 | A * | 4/1996 | Curtis | F16H 1/14 74/417 |
| 5,542,309 | A | 8/1996 | Wenger et al. | |
| 5,596,911 | A | 1/1997 | Panttila | |
| 5,842,377 | A * | 12/1998 | Hutchings | F16H 1/203 74/420 |
| 5,947,218 | A * | 9/1999 | Ishimaru | B60K 17/28 180/53.1 |
| 6,178,851 | B1 | 1/2001 | Aumueller et al. | |
| 6,223,848 | B1 * | 5/2001 | Young | B60K 17/105 180/242 |
| 7,213,488 | B2 | 5/2007 | Daniel | |
| 7,810,412 | B2 | 10/2010 | Yamasaki et al. | |

(Continued)

*Primary Examiner* — Toan C To

(74) *Attorney, Agent, or Firm* — Armstrong Teasdale LLP

(57) ABSTRACT

A gearbox for use in a vehicle having a motor assembly includes a housing and an input shaft coupled to the housing. The input shaft is configured to be coupled to a first component of the motor assembly. The gearbox also includes a first gear set positioned within the housing and coupled to the input shaft. An intermediate shaft is positioned within the housing and is coupled to the first gear set. The gearbox further includes a second gear set positioned within the housing and coupled to the intermediate shaft and an output shaft coupled to the second gear set and to the housing. The output shaft is configured to be coupled to a second component of the motor assembly.

18 Claims, 5 Drawing Sheets

(56) References Cited

U.S. PATENT DOCUMENTS

| | | | | |
|---|---|---|---|---|
| 7,878,304 | B2 | 2/2011 | Reis et al. | |
| 7,944,079 | B1 | 5/2011 | Signore et al. | |
| 2005/0016304 | A1* | 1/2005 | Ishii | B60K 17/28 74/15.4 |
| 2005/0119084 | A1* | 6/2005 | Ishii | B60K 17/043 475/83 |
| 2007/0213171 | A1* | 9/2007 | Pizzichil | F16H 37/041 475/331 |
| 2011/0162472 | A1* | 7/2011 | Adler | F16H 57/021 74/412 R |
| 2015/0068824 | A1* | 3/2015 | Matsuura | B60K 17/105 180/53.4 |
| 2016/0281834 | A1* | 9/2016 | Campbell | F16C 33/6666 |
| 2018/0222484 | A1* | 8/2018 | Shively | B60W 30/1888 |

* cited by examiner

MECHANICAL GEARBOX FOR USE WITH A VEHICLE AND METHODS OF ASSEMBLING THE SAME

BACKGROUND

The field of the disclosure relates generally to gearboxes, and more specifically, to gearboxes for use in a vehicle and including multiple shafts and multiple gear sets.

At least some known vehicles include various mounting brackets and frame members that limit the available space for the motor assembly. Such motor assemblies may include components mounted at different angles with respect to other components. The use of right angle gear drives and universal joints have been known to couple various rotating components of the motor assembly. However, at least some motor assemblies include not only components that are mounted at different angles, but also components mounted at different vertical heights. While known right angle gear drives and universal joints may be used to solve one of these problems, the available space for the motor assembly limits the usefulness of these solutions.

BRIEF DESCRIPTION

In one aspect, a gearbox for use in a vehicle having a motor assembly includes a housing and an input shaft coupled to the housing. The input shaft is configured to be coupled to a first component of the motor assembly. The gearbox also includes a first gear set positioned within the housing and coupled to the input shaft. An intermediate shaft is positioned within the housing and is coupled to the first gear set. The gearbox further includes a second gear set positioned within the housing and coupled to the intermediate shaft and an output shaft coupled to the second gear set and to the housing. The output shaft is configured to be coupled to a second component of the motor assembly.

In another aspect, a vehicle is provided. The vehicle includes a first rotating component configured to rotate about a first axis and a second rotating component configured to rotate about a second axis that is perpendicular to the first axis. The vehicle also includes a gearbox coupled to both the first component and the second component. The gearbox includes a housing and an input shaft coupled to the housing. The gearbox also includes a first gear set positioned within the housing and coupled to the input shaft. An intermediate shaft is positioned within the housing and is coupled to the first gear set. The gearbox further includes a second gear set positioned within the housing and coupled to the intermediate shaft and an output shaft coupled to the second gear set and to the housing.

In yet another aspect, a method of assembling a gearbox for use in a vehicle is provided. The method includes coupling an input shaft to a housing and coupling a first gear set to the input shaft within the housing. An intermediate shaft is coupled to the first gear set within the housing. The method also includes coupling a second gear set to the intermediate shaft within the housing, and coupling an output shaft to the second gear set and to the housing.

Although specific features of various embodiments may be shown in some drawings and not in others, this is for convenience only. Any feature of any drawing may be referenced and/or claimed in combination with any feature of any other drawing.

DETAILED DESCRIPTION

The apparatus, methods, and systems described herein provide a gearbox that fits within the limited available space for the motor assembly and that also connects rotating components oriented at different angles and positioned at different heights within the motor assembly. More specifically, the gearbox includes a housing and an input shaft coupled to the housing. The gearbox also includes a right angle (i.e. bevel, hypoid) gear set positioned within the housing and coupled to the input shaft. An intermediate shaft is positioned within the housing and is coupled to the right angle gear set. The gearbox further includes a parallel shaft (i.e. helical, spur) gear set positioned within the housing and coupled to the intermediate shaft and an output shaft coupled to the parallel shaft gear set and to the housing. In such a configuration, the housing surrounds two different types of gear sets and an intermediate shaft. The internal components facilitate transferring the rotational motion of the input shaft substantially 90 degrees to the output shaft while also accounting for a vertical change in height between the input shaft and the output shaft. Specifically, the gearbox couples a drive pulley with a fan even though the drive pulley and the fan are at differing elevations and mounting angles within the motor assembly. Such a configuration enables simpler installation and maintenance of the motor assembly.

Figure 1:
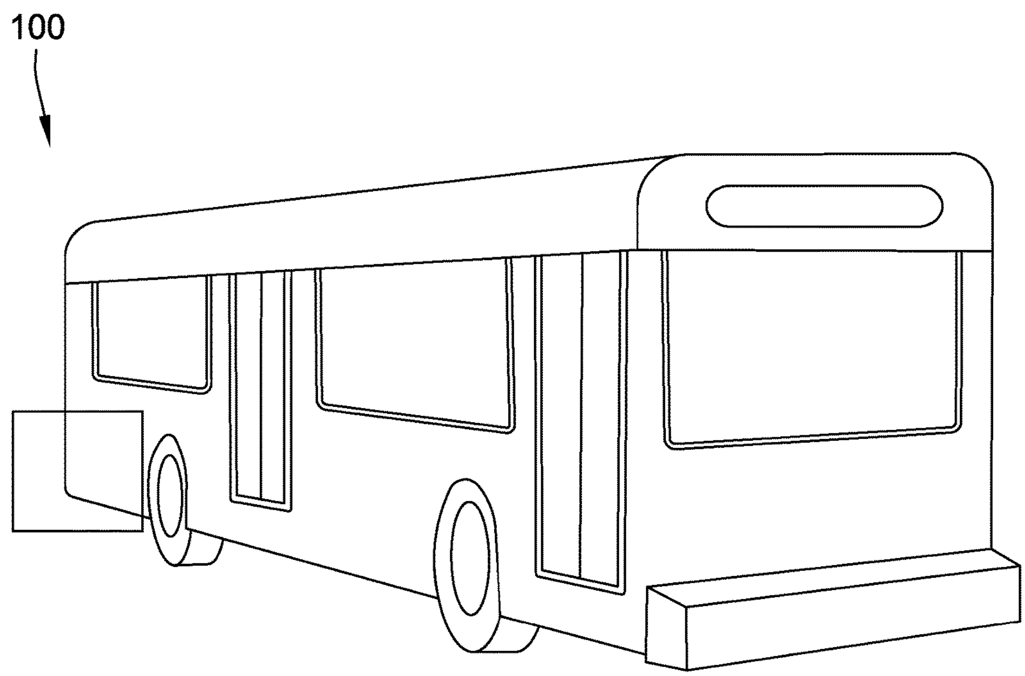
FIG. 1 is a perspective view of a vehicle.
Figure 2:
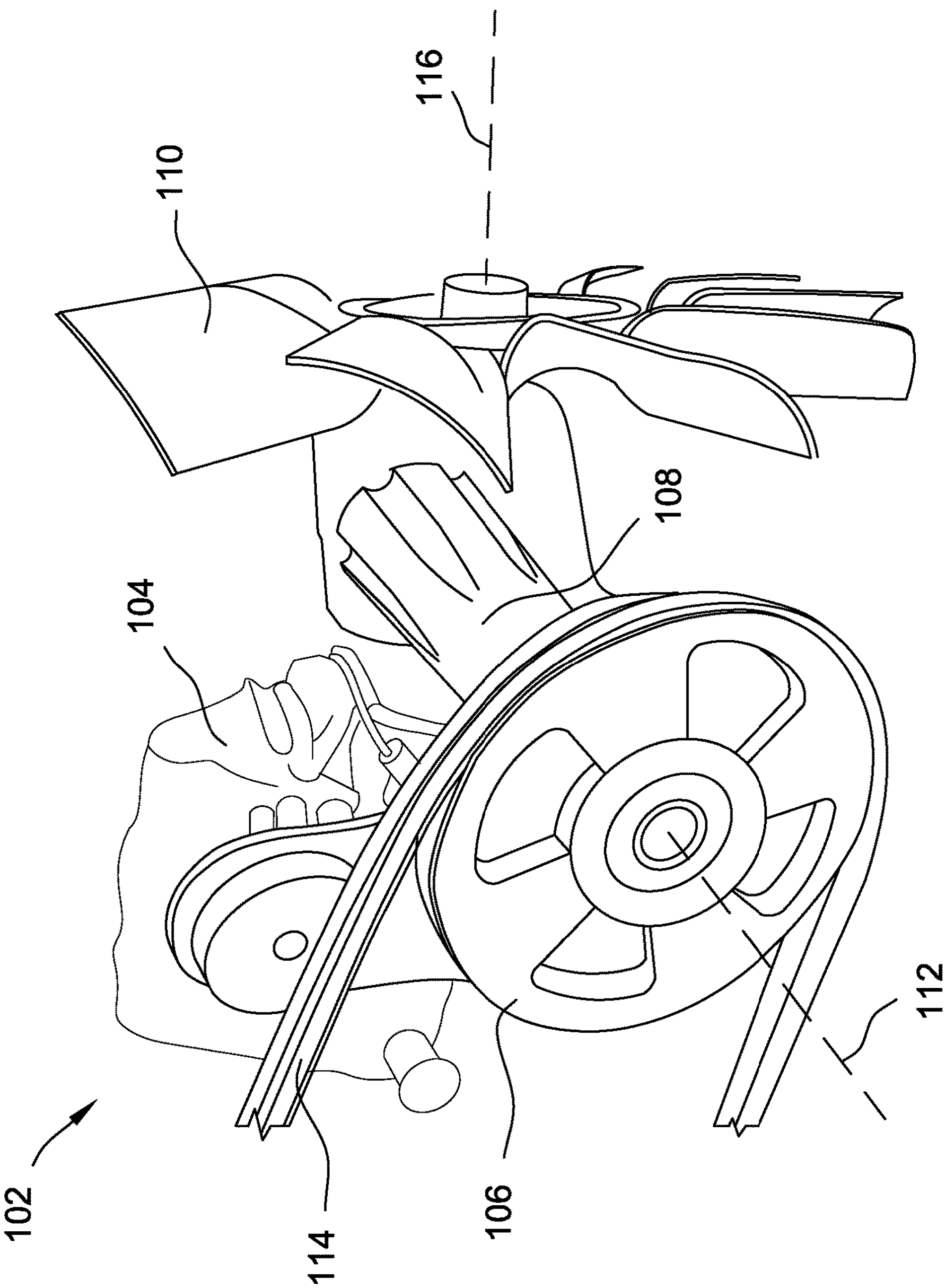
FIG. 2 is a perspective view of an exemplary motor assembly for use with the vehicle shown in FIG. 1.

FIG. 1 is a perspective view of a vehicle 100, and FIG. 2 is a perspective view of a motor assembly 102 for use with vehicle 100 (shown in FIG. 1). In the exemplary embodiment, vehicle 100 is a bus; however, vehicle 100 includes any vehicle and is not limited to a bus as is shown in FIG. 1. Motor assembly 102 includes a motor 104, a first rotating component 106, a gearbox 108, and a second rotating component 110. In the exemplary embodiment, motor 104 includes an internal combustion engine, and first rotating component 106 includes a drive wheel that is rotatably coupled to gearbox 108 such that drive wheel 106 rotates about a first axis 112. A drive belt 114 is coupled between motor 104 and drive wheel 106 such that rotation of motor 104 drives drive belt 114 to rotate drive wheel 106 about axis 112. Second rotating component 110 includes a fan and is rotatably coupled to gearbox 108 such that fan 110 rotates about a second axis 116 that is perpendicular to first axis 112. Rotation of fan 110 about second axis 116 generates a cooling airflow that reduces the temperature of vehicle 100 components, such as, but not limited to, a radiator, exposed to the airflow.

Figure 3:
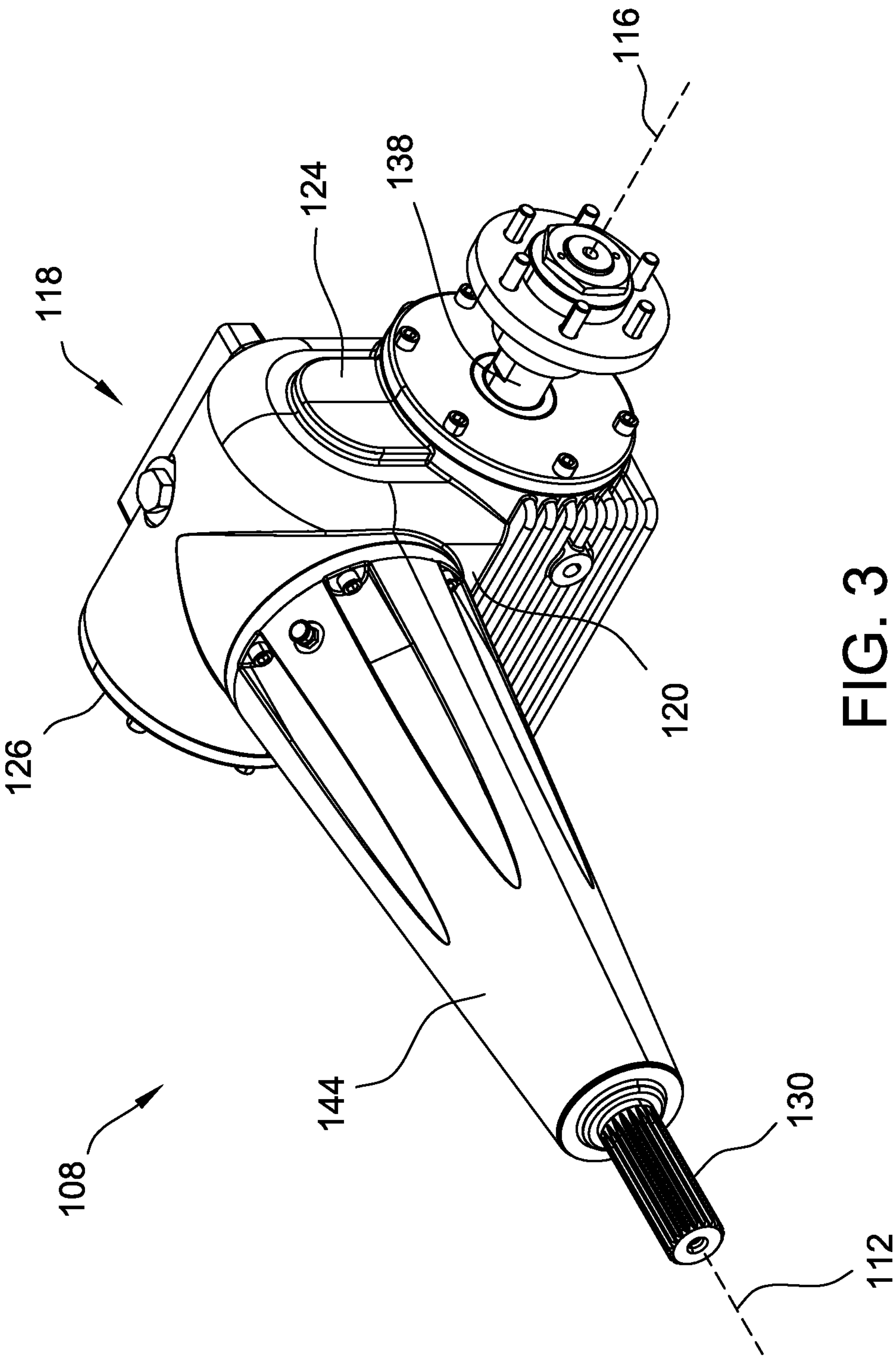
FIG. 3 is a perspective view of an exemplary gearbox for use with the motor assembly shown in FIG. 2.
Figure 4:
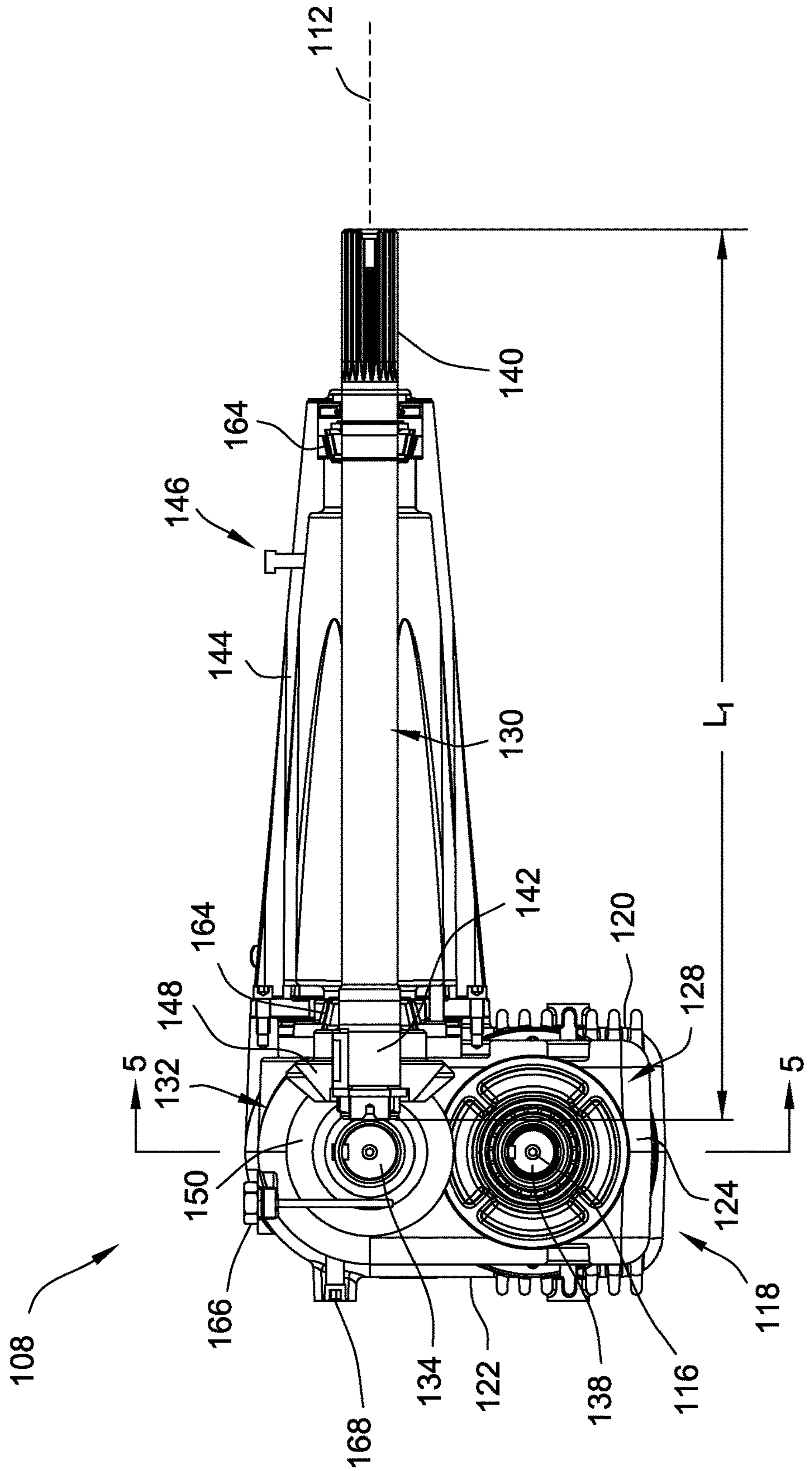
FIG. 4 is a cross-sectional side view of the gearbox shown in FIG. 3.
Figure 5:
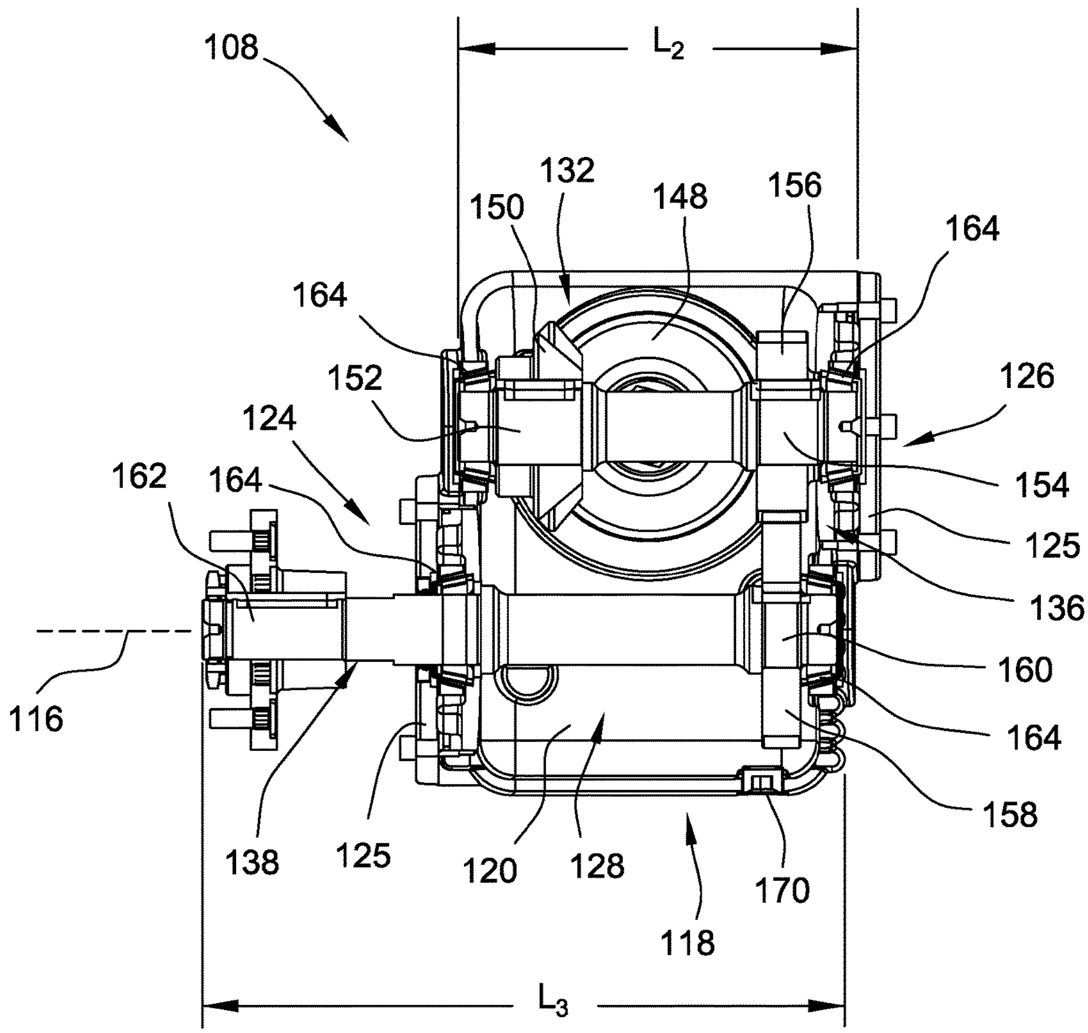
FIG. 5 is a cross-sectional view of the gearbox taken along line 5-5 shown in FIG. 4.

FIG. 3 is a perspective view of gearbox 108 for use with motor assembly 102 (shown in FIG. 2). FIG. 4 is a cross-sectional side view of gearbox 108, and FIG. 5 is a cross-sectional view of the gearbox taken along line 5-5 shown in FIG. 4. In the exemplary embodiment, gearbox 108 includes a housing 118 having a first endwall 120, an opposing second endwall 122, a first sidewall 124, and an opposing second sidewall 126 that combine to define a cavity 128 within housing 118. As shown in FIGS. 3-5, endwalls 120 and 122 are oriented substantially perpendicular to sidewalls 124 and 126. Each of sidewalls 124 and 126 include a removable cover portion 125, as described in further detail below.

Furthermore, gearbox 108 includes an input shaft 130, a first gear set 132, an intermediate shaft 134, a second gear set 136, and an output shaft 138. In the exemplary embodiment, input shaft 130 includes a first end 140 coupled to drive wheel 106 (shown in FIG. 2) and a second end 142 coupled to housing 118 such that second end input shaft 130 extends through first endwall 120 into cavity 128 of housing 118. Input shaft 130 defines a first length L1 between opposing ends 140 and 142. Rotation of drive wheel 106 about axis 112 drives input shaft 130 to also rotate about axis 112. Gearbox 108 also includes an input shaft housing 144 coupled to first endwall 120 of housing 118 and circumscribing input shaft 130. Shaft housing 144 includes a breather vent 146 that couples an interior of shaft housing 144 in flow communication with an exterior environment.

In the exemplary embodiment, first gear set 132 is positioned within cavity 128 of housing 118 and is coupled to input shaft 130. More specifically, first gear set 132 includes a right angle gear set, such as, but not limited to a bevel gear set or a hypoid gear set, including a first right angle gear 148 coupled to second end 142 of input shaft 130 and positioned adjacent first endwall 120 of housing 118. Furthermore, first gear set 132 also includes a second right angle gear 150 coupled to a first end 152 of intermediate shaft 134 and positioned adjacent first sidewall 124 of housing 118. As shown in FIGS. 4 and 5, first and second right angle gears 148 and 150 are oriented perpendicular to each other such that rotation of input shaft 130 causes rotation of first right angle gear 148, which engages and causes rotation of second right angle gear 150.

In the exemplary embodiment, intermediate shaft 134 is positioned entirely with cavity 128 of housing 118 such that intermediate shaft 134 is coupled to and extends between opposing first and second sidewalls 124 and 126. In such a configuration, intermediate shaft 134 extends in a direction parallel to rotational axis 116 and is oriented perpendicular to input shaft 130 and rotational axis 112. Furthermore, as best shown in FIG. 4, intermediate shaft 134 is coplanar, or vertically aligned, with input shaft 130 on a horizontal plane defined by axis 112. Additionally, as shown in FIG. 4, intermediate shaft 134 is vertically offset from output shaft 138 along a vertical axis 115 extending through both intermediate shaft 134 and output shaft 138. Vertical axis 115 is perpendicular to both axes 112 and 116, which are also perpendicular to each other. In other embodiments, such as those that use a hypoid gear set rather than a bevel gear set, intermediate shaft 134 is vertically offset from input shaft 130.

As described above, first end 152 of intermediate shaft 134 is coupled to first sidewall 124 of housing 118 and to second right angle gear 150 of first gear set 132. Additionally, a second end 154 of intermediate shaft 134 is coupled to second sidewall 126 of housing 118 and to second gear set 136. Intermediate shaft 134 defines a second length L2 between opposing ends 152 and 154 that is shorter than first length L1 of input shaft 130. Specifically, second end 154 of intermediate shaft 134 is coupled to cover portion 125 of second sidewall 126. Second gear set 136 is positioned within cavity 128 of housing 118 and is coupled to intermediate shaft 134 and to output shaft 138. More specifically, second gear set 136 includes a parallel shaft gear set, such as, but not limited to a helical gear set or a spur gear set, including a first parallel gear 156 coupled to second end 154 of intermediate shaft 134 and positioned adjacent second sidewall 126 of housing 118. Furthermore, second gear set 136 also includes a second parallel gear 158 coupled to a first end 160 of output shaft 138 and also positioned adjacent second sidewall 126 of housing 118. As shown in FIG. 4, first and second parallel shaft gears 156 and 158 are vertically offset from each other such that rotation of intermediate shaft 134 causes rotation of first parallel gear 156, which engages and causes rotation of second parallel gear 158.

In the exemplary embodiment, output shaft 138 extends across cavity 128 and through a cover portion 125 of first sidewall 124. More specifically, first end 160 of output shaft 138 is coupled to second parallel gear 158 of second gear set 136 and to second sidewall 126 of housing 118. As shown in FIG. 5, output shaft 138 extends through first sidewall 124 along rotational axis 116 and is oriented perpendicular to input shaft 130 and rotational axis 112. Furthermore, as best shown in FIG. 5, output shaft 138 is oriented parallel with intermediate shaft 134 and is vertically offset from both input shaft 130 and intermediate shaft 134 along vertical axis 115 extending through said output shaft and said intermediate shaft. A second end 162 of output shaft 138 is located outside housing 118 and is coupled to fan 110 (shown in FIG. 2) as described above. Output shaft 138 defines a third length L3 between opposing ends 160 and 162 that is shorter than first length L1 of input shaft 130 and longer than second length L2 of intermediate shaft 134.

In the exemplary embodiment, gearbox 108 also includes a plurality of bearings 164 to facilitate rotation of shafts 130, 134, and 138. Specifically, bearings 164 are coupled between housing 118 and each of shafts 130, 134, and 138. More specifically, a bearing 164 is coupled at each opposing end 140 and 142 of input shaft 130 to facilitate rotation of input shaft 130 about axis 112 within shaft housing 144. Furthermore, a bearing 164 is coupled at each opposing end 152 and 154 of intermediate shaft 134 and to the corresponding sidewall 124 and 126 to facilitate rotation of intermediate shaft 134 within housing 118. Additionally, a bearing 164 is coupled between second sidewall 126 of housing 118 and first end 160 of output shaft 138 and also between first sidewall 124 of housing 118 and output shaft 138 at a location along output shaft 138 where output shaft 138 exits housing 118.

As best shown in FIG. 4, gearbox 108 also includes a dipstick 166 coupled to housing 118 and extending into cavity 128 to facilitate determining an oil level within cavity 128 of housing 118. Furthermore, gearbox 108 also includes an oil plug 168 coupled to second endwall 122 to prevent oil within cavity 128 from leaking out of housing 118. Additionally, as shown in FIG. 4, an oil drain 170 is coupled to housing and may be removed to drain oil from within cavity 128 of housing 118.

In operation, internal combustion engine 104 drives drive belt 114 to rotate drive wheel 106 about rotational axis 112. Rotation of drive wheel 106 causes rotation of input shaft 130 and of first right angle gear 148 coupled at second end 142 of input shaft 130. First right angle gear 148 engages second right angle gear 150 to facilitate rotation thereof, which causes intermediate shaft 134 to rotate within housing 118. Rotation of intermediate shaft 134 causes rotation of first parallel gear 156, which then engages second parallel gear 158. Output shaft 138 is driven by rotation of second parallel gear 158 to rotate about rotational axis 116. Rotation of output shaft 138 causes rotation of fan 110, which generates a cooling airflow directed to a component of motor assembly 102 that requires cooling, such as, but not limited to, a radiator.

The apparatus, methods, and systems described herein provide a gearbox that fits within the limited available space for the motor assembly and that also connects rotating components oriented at different angles and positioned at different heights within the motor assembly. More specifically, the gearbox includes a housing and an input shaft coupled to the housing. The gearbox also includes a right angle gear set positioned within the housing and coupled to the input shaft. An intermediate shaft is positioned within the housing and is coupled to the right angle gear set. The gearbox further includes a parallel shaft gear set positioned within the housing and coupled to the intermediate shaft and an output shaft coupled to the parallel shaft gear set and to the housing. In such a configuration, the housing surrounds two different types of gear sets and an intermediate shaft. The internal components facilitate transferring the rotational motion of the input shaft substantially 90 degrees to the output shaft while also accounting for a vertical change in height between the input shaft and the output shaft. Specifically, the gearbox couples a drive pulley with a fan even though the drive pulley and the fan are at differing elevations and mounting angles within the motor assembly. Such a configuration enables simpler installation and maintenance of the motor assembly.

Exemplary embodiments of a gearbox are described above in detail. The gearbox and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gearbox for use in a vehicle including a motor assembly, said gearbox comprising:

a housing;

an input shaft coupled to said housing, said input shaft configured to be coupled to a first component of the motor assembly;

a first gear set positioned within said housing and coupled to said input shaft;

an intermediate shaft positioned within said housing and coupled to said first gear set;

a second gear set positioned within said housing and coupled to said intermediate shaft; and an output shaft coupled to said second gear set and to said housing, said output shaft configured to be coupled to a second component of the motor assembly, wherein said output shaft is vertically offset from said input shaft and from said intermediate shaft along a vertical axis extending through said output shaft and said intermediate shaft.

2. The gearbox in accordance with claim 1, wherein said input shaft is oriented perpendicular to said output shaft and to said intermediate shaft.

3. The gearbox in accordance with claim 1, wherein said input shaft is vertically aligned with said intermediate shaft.

4. The gearbox in accordance with claim 1, wherein said first gear set comprises a right angle gear set and wherein said second gear set comprises a parallel shaft gear set.

5. The gearbox in accordance with claim 1, wherein said first gear set comprises:

a first gear coupled to said input shaft and positioned adjacent an endwall of said housing; and a second gear coupled to said intermediate shaft and positioned adjacent a first sidewall of said housing, wherein said endwall is oriented perpendicular to said first sidewall.

6. The gearbox in accordance with claim 5, wherein said second gear set comprises:

a third gear coupled to said intermediate shaft opposite said second gear, wherein said third gear is positioned adjacent a second sidewall of said housing; and a fourth gear coupled to said output shaft and positioned adjacent said second sidewall of said housing, wherein said second sidewall is oriented perpendicular to said endwall.

7. The gearbox in accordance with claim 1, further comprising a plurality of bearings coupled between said housing and said input shaft, said intermediate shaft, and said output shaft.

8. A vehicle comprising:

a first rotating component configured to rotate about a first axis;

a second rotating component configured to rotate about a second axis that is perpendicular to the first axis, wherein said second rotating component comprises a fan configured to generate a cooling airflow; and a gearbox coupled to both said first component and said second component, said gearbox comprising:

a housing;

an input shaft coupled to said housing, wherein said first rotating component comprises a drive wheel configured to rotate said input shaft;

a first gear set positioned within said housing and coupled to said input shaft;

an intermediate shaft positioned within said housing and coupled to said first gear set;

a second gear set positioned within said housing and coupled to said intermediate shaft; and an output shaft coupled to said second gear set and to said housing.

9. The vehicle in accordance with claim 8, further comprising an internal combustion engine and a drive belt, wherein said drive belt couples said internal combustion engine to said drive wheel.

10. The vehicle in accordance with claim 8, wherein said input shaft comprises a first length and said output shaft comprises a second length shorter than the first length.

11. The vehicle in accordance with claim 8, wherein said first gear set comprises:

a first gear coupled to said input shaft and positioned adjacent an endwall of said housing; and a second gear coupled to said intermediate shaft and positioned adjacent a first sidewall of said housing, wherein said endwall is oriented perpendicular to said first sidewall, and wherein said second gear set comprises:

a third gear coupled to said intermediate shaft opposite said second gear, wherein said third gear is positioned adjacent a second sidewall of said housing; and a fourth gear coupled to said output shaft and positioned adjacent said second sidewall of said housing, wherein said second sidewall is oriented perpendicular to said endwall.

12. The vehicle in accordance with claim 8, wherein said input shaft is oriented perpendicular to said output shaft and to said intermediate shaft.

13. The vehicle in accordance with claim 12, wherein said output shaft is vertically offset from said input shaft and from said intermediate shaft along a vertical axis extending through said output shaft and said intermediate shaft.

14. A method of assembling a gearbox for use in a vehicle, said method comprising:

coupling an input shaft to a housing;

coupling a first gear set to the input shaft within the housing;

coupling an intermediate shaft to the first gear set within the housing;

coupling a second gear set to the intermediate shaft within the housing; and coupling an output shaft to the second gear set and to the housing, wherein coupling the input shaft comprises coupling the input shaft such that the input shaft is vertically offset from the output shaft along a vertical axis and such that the input shaft is vertically aligned with the intermediate shaft along the vertical axis.

15. The method in accordance with claim 14, wherein coupling the input shaft comprises coupling the input shaft such that the input shaft is oriented perpendicular to the intermediate shaft and the output shaft.

16. The method in accordance with claim 14, wherein coupling the first gear set comprises:

coupling a first right angle gear of the first gear set to the input shaft proximate an endwall of the housing; and coupling a second right angle gear of the first gear set to the intermediate shaft proximate a first sidewall of the housing, and wherein coupling the second gear set comprises:

coupling a first parallel gear of the second gear set to the intermediate shaft proximate a second sidewall of the housing; and coupling a second parallel gear of the second gear set to the output shaft proximate the second sidewall of the housing.

17. The method in accordance with claim 14, further comprising coupling a shaft housing to an endwall of the housing such that the shaft housing circumscribes the input shaft.

18. A vehicle comprising:

a first rotating component configured to rotate about a first axis;

a second rotating component configured to rotate about a second axis that is perpendicular to the first axis; and a gearbox coupled to both said first component and said second component, said gearbox comprising:

a housing;

an input shaft coupled to said housing;

a first gear set positioned within said housing and coupled to said input shaft;

an intermediate shaft positioned within said housing and coupled to said first gear set;

a second gear set positioned within said housing and coupled to said intermediate shaft; and an output shaft coupled to said second gear set and to said housing, wherein said output shaft is vertically offset from said input shaft and from said intermediate shaft along a vertical axis extending through said output shaft and said intermediate shaft.

* * * * *